(12) United States Patent
Hildreth

(10) Patent No.: US 8,068,641 B1
(45) Date of Patent: Nov. 29, 2011

(54) INTERACTION INTERFACE FOR CONTROLLING AN APPLICATION

(75) Inventor: Evan Hildreth, Ottawa (CA)

(73) Assignee: QUALCOMM Incorporated, San Diego, CA (US)

( * ) Notice: Subject to any disclaimer, the term of this patent is extended or adjusted under 35 U.S.C. 154(b) by 832 days.

(21) Appl. No.: 12/142,455

(22) Filed: Jun. 19, 2008

(51) Int. Cl.
G06K 9/00 (2006.01)
H04N 5/30 (2006.01)
H04N 5/335 (2011.01)
G01B 11/14 (2006.01)
G01C 21/02 (2006.01)
G01C 21/24 (2006.01)
G01J 1/20 (2006.01)
G01N 21/86 (2006.01)
G01V 8/00 (2006.01)

(52) U.S. Cl. ... 382/103; 348/162; 356/614; 250/559.11; 250/203.1; 250/559.29; 250/559.38

(58) Field of Classification Search ............... 382/103; 348/162; 356/614; 250/559.11, 203.1, 559.29, 250/559.38
See application file for complete search history.

(56) References Cited

U.S. PATENT DOCUMENTS

| | | | |
|---|---|---|---|
| 5,442,168 A * | 8/1995 | Gurner et al. | 463/36 |
| 5,704,836 A | 1/1998 | Norton et al. | |
| 5,767,842 A | 6/1998 | Korth | |
| 6,037,882 A | 3/2000 | Levy | |
| 6,043,805 A | 3/2000 | Hsieh | |
| 6,281,878 B1 * | 8/2001 | Montellese | 345/156 |
| 6,424,334 B1 | 7/2002 | Zimmerman et al. | |
| 6,614,422 B1 | 9/2003 | Rafii et al. | |
| 6,650,318 B1 | 11/2003 | Arnon | |
| 6,754,370 B1 * | 6/2004 | Hall-Holt et al. | 382/106 |
| 7,058,204 B2 | 6/2006 | Hildreth et al. | |
| 7,307,661 B2 | 12/2007 | Lieberman et al. | |
| 7,832,126 B2 * | 11/2010 | Koellner et al. | 37/348 |
| 7,857,224 B2 * | 12/2010 | Lei | 235/462.42 |
| 2001/0012001 A1 * | 8/2001 | Rekimoto et al. | 345/173 |
| 2007/0040062 A1 * | 2/2007 | Lau et al. | 244/3.16 |
| 2008/0089587 A1 | 4/2008 | Kim et al. | |

OTHER PUBLICATIONS

Notice of Allowance and Fee(s) Due for U.S. Appl. No. 12/142,430, mailed Apr. 6, 2010, 8 pages.
U.S. Appl. No. 12/142,430, filed Jun. 19, 2008.

* cited by examiner

Primary Examiner — Andrew W Johns
Assistant Examiner — Shefali Goradia
(74) Attorney, Agent, or Firm — Kilpatrick Townsend & Stockton LLP

(57) ABSTRACT

Image sequences are accessed, the sequences each taken, from a different perspective, of a portion of a radiation region defined by projected electromagnetic radiation. The image sequences each include a projection image taken during an emitting period in which the projected electromagnetic radiation is emitted, the projection image being of ambient electromagnetic radiation and of an object within the portion being illuminated with the projected electromagnetic radiation, and an ambient image taken during an extinguishing period in which the projected electromagnetic radiation is extinguished, the ambient image being of the ambient electromagnetic radiation. A position of the object using the projection images and the ambient images is determined, an application is controlled based on the determined position.

23 Claims, 11 Drawing Sheets

EMITTING

EXTINGUISHING

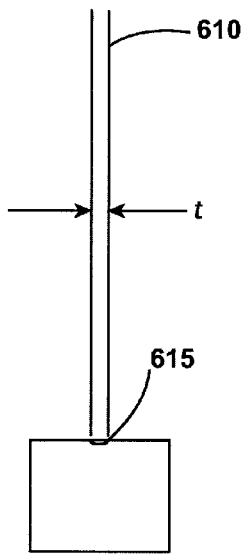
FIG.6A
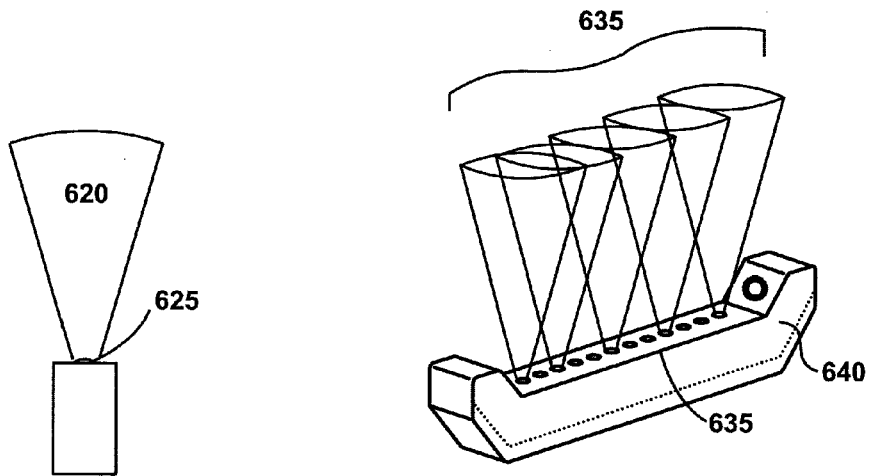
FIG.6B
FIG.6C

INTERACTION INTERFACE FOR CONTROLLING AN APPLICATION

TECHNICAL FIELD

This description relates to techniques for determining a position of an illuminated object and controlling an application based on the determined position.

BACKGROUND

Applications may be controlled by holding, or otherwise touching, tactile devices that are directly coupled to a device running the application. For example, an input device or pointing device is a hardware component that allows a computer user to input data into a computer. A control (or widget) of an application is an interface element that the computer user interacts with, such as by using an input device, to provide a single interaction point for the manipulation of data.

SUMMARY

In one aspect, image sequences are accessed, the sequences each taken, from a different perspective, of a portion of a radiation region defined by projected electromagnetic radiation. The image sequences each include a projection image taken during an emitting period in which the projected electromagnetic radiation is emitted, the projection image being of ambient electromagnetic radiation and of an object within the portion being illuminated with the projected electromagnetic radiation, and an ambient image taken during an extinguishing period in which the projected electromagnetic radiation is extinguished, the ambient image being of the ambient electromagnetic radiation. A position of the object using the projection images and the ambient images is determined, an application is controlled based on the determined position.

Implementations may include one or more of the following aspects. In the emitting and extinguishing periods, emitting and extinguishing the projected electromagnetic radiation may be alternated. Modified images may be generated based upon modifying each projection image with a corresponding ambient image, where the position is determined using the modified images. Generating the modified images may include subtracting the corresponding ambient image from each projection image. Whether the modified images include pixel values less than zero may be determined, and, if the modified images include pixels values less than zero, any pixel value less than zero may be set to zero. The projection image may be of the ambient electromagnetic radiation, of the object within the portion being illuminated with the projected electromagnetic radiation, and of a reflection of a background illuminated by the projected electromagnetic radiation. The reflection of the background may be modeled, and the projected image may be modified based on the modeled reflection. The ambient images may be compensated to account for illumination of the object by the ambient electromagnetic radiation. The ambient light may include unobscured ambient light not obscured by the object. Each image sequence may include at least a pair of images, where the pair of images may include the projection image and the ambient image. The ambient image may be taken during an extinguishing period that immediately proceeds or immediately follows the emitting period during which the projected image is taken.

Determining the position may include determining two-dimensional or three-dimensional coordinates representing the position relative to an edge of the region. The determined position may be output to the application. A motion of the object may be determined based on the determined position, and the application may be controlled based on the determined motion. Determining the position of the object using the projection images and the ambient images may include determining a first position of the object using the projection images and the ambient images from a first sequence taken from the first perspective, determining a second position of the object using the projection images and the ambient images from a second sequence taken from the second perspective, and combining the first position of the object and the second position of the object. The first and second positions may be combined using triangulation. The projected electromagnetic radiation may include infrared light. Each projection image and ambient image may be cropped, and the position of the object may be determined using the cropped projection images and ambient images. A region of interest may be defined within the radiation region. The position may be expressed as a percentage of a height of the region of interest and a percentage of a width of the region of interest.

In another aspect, a device includes a processor configured to access image sequences, the sequences each taken, from a different perspective, of a portion of a radiation region defined by projected electromagnetic radiation. Each of the image sequences includes a projection image taken during an emitting period in which the projected electromagnetic radiation is emitted, the projection image being of ambient electromagnetic radiation and of an object within the portion being illuminated with the projected electromagnetic radiation, and an ambient image taken during an extinguishing period in which the projected electromagnetic radiation is extinguished, the ambient image being of the ambient electromagnetic radiation. A position of the object is determined using the projection images and the ambient images, and an application is controlled based on the determined position. The device also includes a memory configured to store the image sequences, and transfer the image sequences to the processor.

In another aspect, a system includes an interaction interface configured to control an application based on a position of an object. The interaction interface includes a processor configured to access image sequences, the sequences each taken, from a different perspective, of a portion of a radiation region defined by projected electromagnetic radiation. The image sequences include a projection image taken during an emitting period in which the projected electromagnetic radiation is emitted, the projection image being of ambient electromagnetic radiation and of an object within the portion being illuminated with the projected electromagnetic radiation, and an ambient image taken during an extinguishing period in which the projected electromagnetic radiation is extinguished, the ambient image being of the ambient electromagnetic radiation. The processor is also configured to determine a position of the object using the projection images and the ambient images. The system also includes an application interface configured to output the position, and a memory configured to store the image sequences, and transfer the image sequences to the processor. The system also includes a device executing the application, the device receiving the position and transferring the position to the application such that the application reacts based on the position.

In another aspect a computer-readable medium encoded with a computer program product including instructions that, when executed, operate to cause a computer to perform operations including accessing image sequences, the sequences each taken, from a different perspective, of a portion of a radiation region defined by projected electromagnetic radiation. Each of the image sequences includes a projection image taken during an emitting period in which the projected electromagnetic radiation is emitted, the projection image being of ambient electromagnetic radiation and of an object within the portion being illuminated with the projected electromagnetic radiation, and an ambient image taken during an extinguishing period in which the projected electromagnetic radiation is extinguished, the ambient image being of the ambient electromagnetic radiation. A position of the object is determined using the projection images and the ambient images, and an application is controlled based on the determined position.

Implementations of any of the techniques described above may include a method, a process, a system, a device, an apparatus, an interaction interface, instructions stored on a computer-readable medium, a computer-readable medium encoded with a computer program. The details of one or more implementations are set forth in the accompanying drawings and the description below. Other features will be apparent from the description and drawings, and from the claims.

DESCRIPTION OF THE FIGURES

FIGS. 6A-6C show example radiation regions.

DETAILED DESCRIPTION

An interaction interface may control an application running on a device separate from the interaction interface by determining a position of an object with respect to a housing of the interaction interface and controlling the application based on the determined position.

Figure 1A:
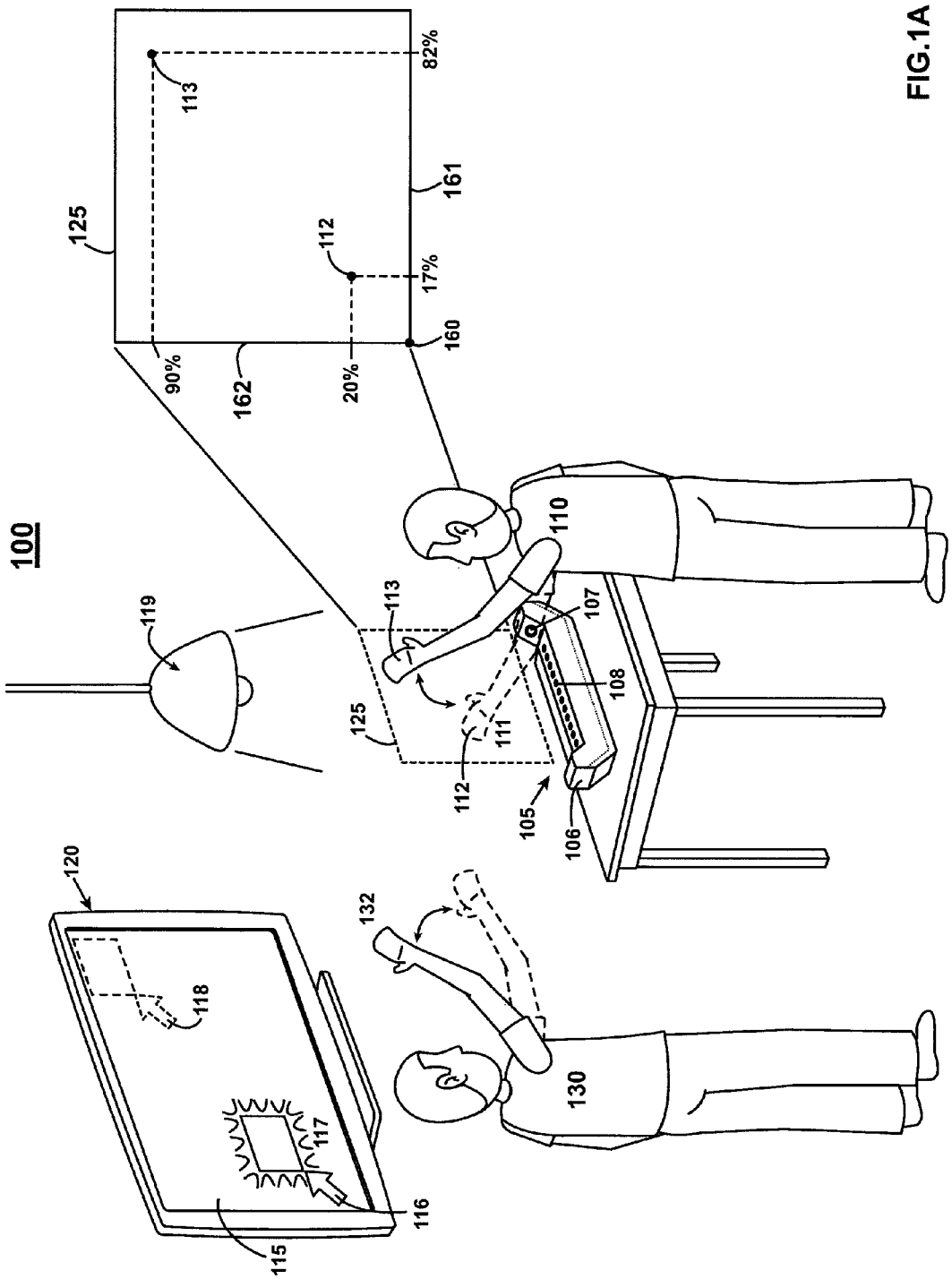
FIG. 1A is an illustration of an example scenario in which a user controls an application through an interaction interface.

Referring to FIG. 1A, an example scenario 100 illustrates an interaction interface 105 through which a user 110 interacts with and/or controls an application 115 that is remote from the interaction interface 105. The user 110 interacts with the application 115 through the interaction interface 105 without requiring the user to touch or otherwise make direct contact with the interaction interface 105. In particular, the interaction interface 105 determines a position of an object 111 (which is a hand or finger of the user 110 in this example), or an indicia of the position of the object 111, with respect to the interaction interface 105. The position, or indicia of the position, of the object 111 is used to control the application 115. For example, the position of the object 111 may be used to determine the position of a cursor 116 used in the application 115.

By determining the position, or an indicia of the position, of the object 111, the interaction interface 105 allows the user to interact with and/or control the application 115 with natural hand motions and without having to make direct contact with physical hardware connected to a device running the application 115. As compared to techniques that employ tactile devices (such as, for example, mice, keyboards, and styli) or voice-based input, which may be unreliable, the interaction interface 105 may allow the user 110 to interact more easily and more accurately with the application 115.

The interaction interface 105 includes a housing 106, sensors 107, and emitters 108. Although, due to the perspective of the scenario 100, only one sensor is shown in the example of FIG. 1A, the interaction interface 105 may include at least one additional sensor. The example shown in FIG. 1A includes multiple emitters 108; however in other examples, the interaction interface 105 may include a single emitter. The emitters 108 are configured to alternate between emitting electromagnetic radiation during an emitting period and extinguishing electromagnetic radiation during an extinguishing period. Thus, the emitters 108 emit flashing electromagnetic radiation. The emitters 108 may be, for example, emitters of infrared radiation. The sensors 107 collect data during the emitting and extinguishing periods. The sensed electromagnetic radiation from both the emitting and extinguishing periods is used to determined a position of the object 111 relative to the interaction interface 105, and the determined position of the object 111 is used to control the application 115.

During emitting periods, the object 111 is illuminated with electromagnetic radiation emitted from emitters 108, and electromagnetic radiation reflected from the illuminated object 111 is detected by sensors 107. Thus, during emitting periods, objects illuminated by the emitted electromagnetic radiation reflect the electromagnetic radiation and are imaged by the sensors 107. However, objects that are self-illuminating (such as a ceiling light 119) or are reflecting electromagnetic radiation from other sources are present in images collected by the sensors 107 during emitting periods and during extinguishing periods. Thus, objects illuminated by the emitted electromagnetic radiation may be present only in images collected by the sensors 107 during periods when the emitters emit electromagnetic radiation, or are more visible or prevalent in those images. Accordingly, modifying an image collected during an emitting period with an image collected during an extinguishing period removes most, if not all, of the self-illuminated objects from the resulting modified image. Because the modified image may include only those objects that are illuminated by the electromagnetic radiation (such as the hand 111), the modified image may be analyzed to determine the position of the illuminated object.

In the example shown in FIG. 1A, the application 115 is a software application that includes a user interface displayed on a screen 120. The software application may be, for example, a slide presentation application running on a personal computer and displayed on the screen 120 by a projector. To control the application 115, the object 111 (which is a hand or finger of the user 110 in this example) moves from a first object position 112 to a second object position 113 within a defined region of interest 125.

Objects outside of the region of interest 125 (such as the ceiling light 119 and an audience member 130 moving their hand 132 to attract the attention of the user 110) may not be illuminated by the emitters. Thus, objects such as the hand 132 and the ceiling light 119 are either not imaged by the sensor 107 at all (such as the hand 132) or are self-illuminating objects that are detected by the sensors regardless of whether the object is illuminated by the emitted electromagnetic radiation or not (such as the ceiling light 119). Accordingly, objects such as the hand 132 and the ceiling light 119 either do not appear in any images generated by the sensors 107 or appear in all images collected by the sensors 107 are removable from the images collected by the sensors 107. Thus, the position of either type of object is not determined and the objects do not interfere with the determination of the positions 112 or 113.

The up-and-right motion of the hand 111 of the user 110 from the first object position 112 to the second object position 113 results in a cursor 116 moving up-and-right from a first cursor position 117 to a second cursor position 118. Thus, by moving the hand 111 from the first object position 112 to the second object position 113, the user 110 causes the cursor 116 to move from the first cursor position 117 to the second cursor position 118 on the screen 120. The movement of the cursor 116 may allow the user 110 to, for example, select an icon shown at the second cursor position 118 or close a graphical user interface window shown at the second cursor position 118. Actions such as selecting or closing may be performed by additional movements of the hand 111 and/or by gestures of the hand 111. Thus, controlling an application may involve mapping detected object positions to mouse events.

Figure 1B:
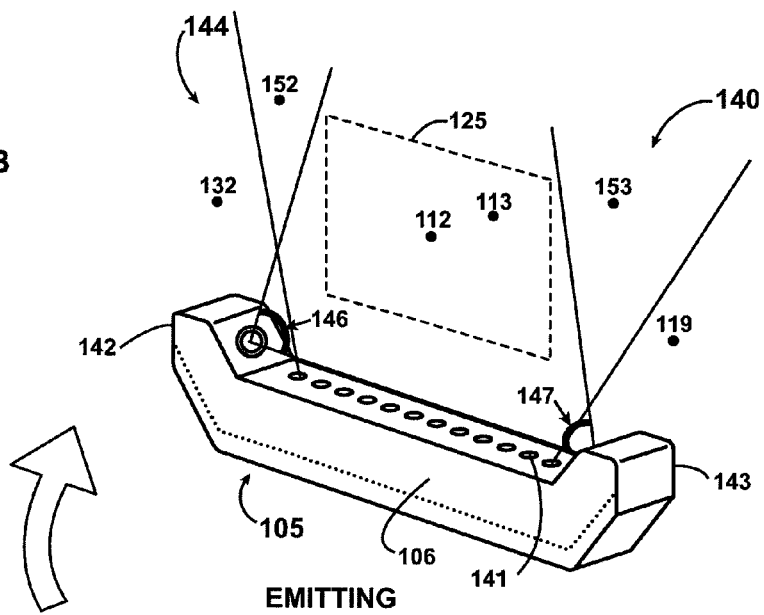
FIG. 1B shows an example interaction interface during an emitting period.
Figure 1C:
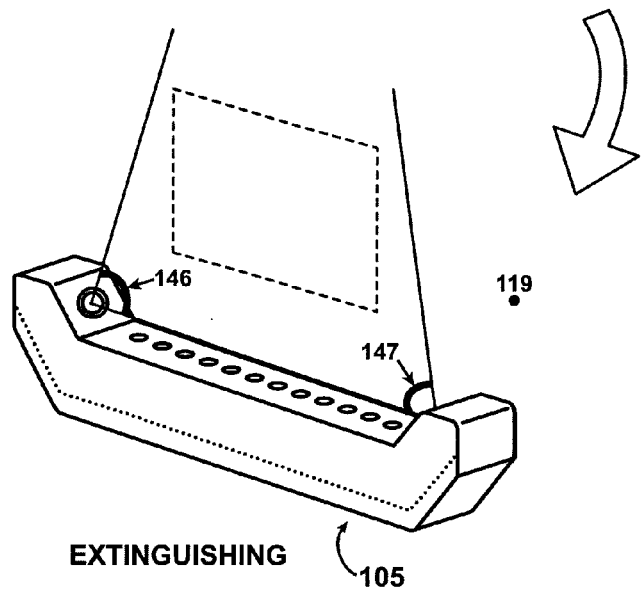
FIG. 1C shows an example interaction interface during an extinguishing period.

Referring to FIGS. 1B and 1C, the interaction interface 105 is shown emitting projected electromagnetic radiation during an emitting period (FIG. 1B) and extinguishing projected electromagnetic radiation during an emitting period (FIG. 1C). The projected radiation is emitted from the emitters 108, and the projected radiation defines a radiation region 140 that includes the region of interest 125. The region of interest 125 may be dynamically defined as a rectangular region within both the fields of view of at least two sensors, and the radiation region 140. The shape and position of the region of interest 125 may be defined based on the size and shape of the screen 125, the capabilities of the sensors and emitters, the position of the user 110 relative to the housing 106, user preferences, or other factors.

Objects within the radiation region 140 are illuminated by the projected radiation during the emitting period and may be referred to as illuminated objects. The projected radiation region 140 is adjacent to the housing 106. For example, the projected radiation region 140 may extend vertically from a top side 141 of the housing 106, as columns or cones of electromagnetic radiation. The radiation region 140 may include regions above the housing 106 and within edges 142, 143 while excluding regions that are above the housing 106 and outside of the edges 142, 143 (such as a region 144). Thus, objects that are outside of the radiation region 140 (such as the audience member's hand 132) are not illuminated by the emitters 108.

Furthermore, while FIG. 1B describes the radiation region 140 as arising vertically "above" the housing 106, if reoriented or reconfigured the radiation region may extend outwardly from the housing 106 in any direction, including below, to the side, or to the front or back. For instance, if the housing 106 were hung from the ceiling, the radiation region may extend vertically downward from the housing, to the floor.

The sensors 107 each have a field of view, which may be considered to be an angular extent of a region that is observable by each of the sensors 107. In the example shown in FIG. 1B, the interaction interface 105 includes two sensors (not shown), which have respective fields of view 146 and 147.

The region of interest 125 may be defined by the portion of the radiation region 140 that falls within both of the fields of view 146 and 147. Thus, the region of interest 125 may be that portion of the radiation region 140 that is observable, or imaged, by the sensors 107. In this manner, objects within the region of interest 125 may both illuminated by projected radiation emitted from the emitters 108 and imaged by the sensors 107 such that the position of the objects within the region of interest 125 may be determined.

In particular, the objects within the region of interest 125 are imaged from two perspectives, which allows the positions of the objects within the regions of interest 125 to be determined. For example, objects within the region of interest 125 are imaged with a sensor having the field of view 146 and a sensor having a field of view 147. Positions of the objects with respect to the field of views 146 and 147 are determined from, for example, the image data produced by the sensors 107. Because the actual positions of the sensors 107 are known, the angular extent of the fields of view 146 and 147 are known, and the position of the region of interest 125 relative to the sensors 107 and housing 106 is also known, the position of the objects within the region of interest 125 relative to the housing may be determined.

In the example shown in FIG. 1B, the hand 111 of the user 110 is within the region of interest 125 at both the first object position 112 and the second object position 113. Thus, the position of the hand 111 of the user 110 is illuminated by the projected electromagnetic radiation during the emitting period, and the position of the hand 111 may be determined relative to the housing 106. Referring briefly to FIG. 1A, the position of the hand 111, and other objects within the region of interest 125, may be determined relative to a corner 160 of the region of interest 125. For example, the region of interest 125 may include a horizontal axis 161 and a vertical axis 162, and the positions of the first object position 112 and the second object position 113 may be determined to be a percentage of the total length of the horizontal axis 161 and the vertical axis 162. For example, the first object position 112 may be a position that is 17% of the length of the horizontal axis 161 and 20% of the length of the vertical axis 162, and the second object position 113 may be a position that is 82% of the length of the horizontal axis 161 and 90% of the length of the vertical axis 162. In other examples, the first and second object positions 112, 113 may be measured from another point within the region of interest 125 or from another point on the boundary of the region of interest 125. By expressing object positions as percentages instead of coordinates, the position indicia can be output without providing the resolution of the screen 120 to the interaction interface 105.

Referring again to FIGS. 1B and 1C, although positions of objects within the region of interest 125 are determined, positions of objects that are outside of the region of interest are not necessarily determined. For example, the hand 132 of the audience member is not within the region of interest 125, nor is the ceiling light 119. Additionally, neither the hand 132 nor the ceiling light 119 are within the radiation region 140; thus, neither the hand 132 nor the ceiling light 119 is illuminated with the projected electromagnetic radiation during an emitting period. As discussed above, the ceiling light 119 is a self-illuminating object in the field of view 146 that appears in images collected during both emitting and extinguishing periods and is removed from the images from which the positions of objects are determined. Thus, although objects such as the ceiling light 119 are imaged by the sensors 107, the position of these objects is not determined. Other objects, such as an object 152, may be within the field of view 147 and within the radiation region 140 but not in the field of view 146. Thus, the object 152 is illuminated by the projected electromagnetic radiation, and the object 152 is imaged by the sensor associated with the field of view 147. However, the object 152 is not imaged by the sensor associated with the field of view 146. Thus, the position of the object 152 is not determined. Similarly, the object 153 is within the field of view 146 and is within the radiation region 140, but the object 153 is not within the field of view 147. Thus, positions of the object 153 is not determined.

Referring to FIG. 1C, the interaction interface 105 is shown extinguishing projected radiation during an extinguishing period. During the extinguishing period, the emitters 108 are turned off, switched off, blocked, extinguished, or otherwise configured to not project electromagnetic radiation. The extinguishing period shown in FIG. 1C occurs immediately or shortly after the emitting period shown in FIG. 1B. Thus, the objects shown in FIG. 1B are present during the extinguishing period shown in FIG. 1C. However, during the extinguishing period, the emitters 108 emit no, or very little, electromagnetic radiation. Thus, during the extinguishing period, objects that otherwise would be within the radiation region 140 (such as the hand 111) are not illuminated by projected electromagnetic radiation, and, thus, are not imaged by the sensors 107. However, objects within the field of view 146 and 147 are imaged by the sensors 107 even during the extinguishing period, and self-illuminating objects such as the ceiling light 119, appear in images collected by the sensors 107 during the extinguishing period. Because the self-illuminating objects appear in both images collected during the emitting period and during the extinguishing period and the illuminated objects (such as the hand 111) appear only in the images collected during the extinguishing period, the self-illuminating objects may be removed from the image data. The illuminated objects remain in the image data and may be analyzed to determine the positions of the illuminated objects relative to the housing 106.

Thus, through the interaction interface 105, the user may interact with the application 115. While the application has been described above as being remote from the interaction interface 105, such description is made merely for the sake of brevity. In other exemplary implementations, the application may be invoked locally on the interaction interface 105.

Figure 2:
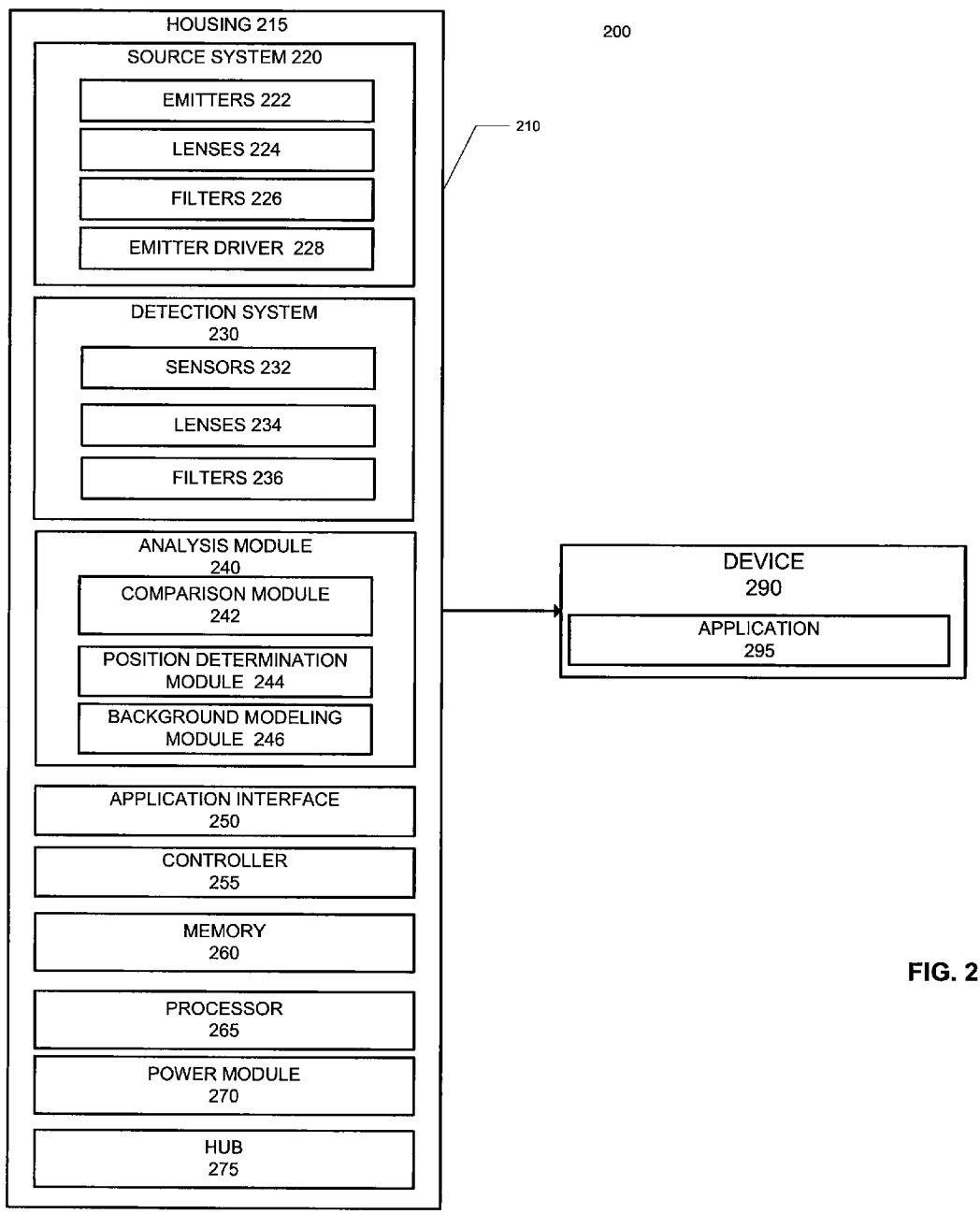
FIG. 2 shows a block diagram of an example interaction interface.

Referring to FIG. 2, a block diagram of an example system 200 includes an interaction interface 210 for controlling and/or interacting with a device 290 that runs an application 295. The interaction interface 210 may be similar to the interaction interface 105 discussed above with respect to FIGS. 1A-1C. For example, the interaction interface 210 may be used to control a software application (such as a presentation program) running on a personal computer.

The interaction interface 210 includes a housing 215, a source system 220, a detection system 230, an analysis module 240, an application interface 250, a controller 255, a memory 260, a processor 265, a power module 270, and a hub 275. The housing 215 may be similar to the housing 106 discussed above with respect to FIGS. 1A-1C. The housing 215 may enclose all or some of the components of the interaction interface 210. For example, the source system 220, the detection system 230, the analysis module 240, the controller 255, the application interface 250, the processor 265, the memory 260, and the power module 270 may all be enclosed within the housing 215 such that the housing has a relatively smooth surface without protruding components. Such a design may allow the interaction interface 210 relatively easy to transport with other personal effects while also protecting the components of the interaction interface 210.

In some implementations, the housing includes ports that open to the exterior of the housing 215 to allow, for example, devices and/or sources of power to connect to the interaction interface 210. The housing 215 may be made of any type of material that is relatively rigid, durable, and lightweight. For example, the housing 215 may be made from plastic, metal, or a combination of such materials. In implementations in which the source system 220 is partially or completely enclosed within the housing 215, the housing 215 may include a material that is transparent to the electromagnetic radiation emitted from the emitters. The material may be placed over the emitters such that the electromagnetic radiation emitted from the emitters leaves the housing during an emitting period to illuminate objects in the region of interest 105. Similarly, in implementations in which the sensor system is partially or completely enclosed in the housing 215, the material may be placed over the sensors such that electromagnetic radiation reaches the sensors. In addition to being transparent to the electromagnetic radiation, the material may be opaque to wavelengths outside of the wavelength band of the electromagnetic radiation. Thus, the material may act as a filter in these implementations.

The housing 215 may be generally cubic in shape. For example, the housing may have a longitudinal cross section in the shape of, for example, a rectangle, a substantially square shape, a diamond, or a trapezoid. In some implementations, the housing 215 includes one or more flanges at either end of the housing 215. The flanges may include a portion that is higher than the other portions of the housing 215, and the flanges may house all or part of the sensor system 230. In some implementations, the sensor system 230 is located in a portion of the housing 215 other than the flanges.

The source system 220 generates projected electromagnetic radiation to form the radiation region 140 during an emitting period as discussed above with respect to FIGS. 1A-1C. The source system 220 includes emitters 222, lenses 224, filters 226, and an emitter driver 228. The emitters 222 may be LEDs that emit infrared light in the near-infrared spectral region. In some implementations, the emitters 222 are LEDs that emit light having a wavelength of approximately 850 nanometers (nm). The source system 220 may include multiple emitters 222, or the source system 220 may include a single emitter. The emitters 222 emit electromagnetic radiation of sufficient power to illuminate objects within the radiation refion 140; however, the electromagnetic radiation emitted by the emitters 222 is sufficiently low power as to not pose a safety threat to the eyes of persons in the vicinity of the interaction interface 210 (such as a user of the interaction interface 210).

The source system 220 also may include lenses 224. The lenses 224 may be used to shape the electromagnetic radiation that is emitted from the emitters 222. For example, the lenses 224 may be narrow-angle lenses that have a relatively small angle of half intensity (such as an angle of half intensity of 6-7 degrees). Such a lens 224 may be used to collimate, or partially collimate, the electromagnetic radiation emitted from the emitters 222 such that the radiation region 140 is defined within a region that is adjacent to the housing 215 but does not spread beyond the edges of the housing. Defining the radiation region 140 in this manner may allow the interaction interface 210 to avoid detecting extraneous objects outside of the region of interest 125 (such as the audience member's hand 132 shown in FIG. 1A). The source system 220 also may include filters 226. The filters 226 may be used to generate electromagnetic radiation of a particular wavelength or band of wavelengths. For example, the filters 226 may be band-pass filters that filter electromagnetic radiation emitted from the emitters 222 such that the electromagnetic radiation has a wavelength in the near-infrared region.

The source system 220 also includes the emitter driver 228. As discussed above with respect to FIGS. 1A-1C, the interaction interface 105 emits projected electromagnetic radiation during an emitting period and extinguishes electromagnetic radiation during an extinguishing period. Similarly, the interaction interface 210 emits projected electromagnetic radiation during an emitting period and extinguishes electromagnetic radiation during an extinguishing period. The emitter driver 228 drives the emitters 222 such that the emitters 222 are on (and emit electromagnetic radiation) during the emitting period and off (such that the emitters 222 extinguish, or do not emit, electromagnetic radiation) during the extinguishing period. The emitter driver 228 may include a timer that sets the duration of the emitting and extinguishing periods. In some implementations, the duration of the emitting and extinguishing periods are the same. The emitter driver 228 may be controlled by the controller 255 (e.g., the controller 255 may set the emitting and extinguishing periods).

The interaction interface 210 also includes the detection system 230. The detection system 230 collects and images electromagnetic radiation reflected from objects within the radiation region 140 and electromagnetic radiation emitted from self-emitting objects within the fields of view of the sensors 232. The detection system 230 includes sensors 232, lenses 234, and filters 236. The sensors 232 include more than one sensor, and the sensors may be the same type of sensor. In some implementations, the detection system 230 includes two sensors. The sensors 232 may be, for example, cameras. In some implementations, the sensors 232 are Firefly® MV cameras, or Dragonfly® 2 cameras, both of which are available from Point Grey Research of Vancouver, British Columbia, Canada. In some implementations, the sensors 232 are digital cameras, and in some implementations, the sensors 232 are video cameras. The sensors 232 include lenses 234 to capture and focus electromagnetic energy within the field of view of the sensors 232.

The sensors 232 also include filters 236. The filters 236 may be filters that allow electromagnetic radiation having wavelengths equal to those wavelengths emitted by the emitters 222 to reach the sensors 232 while preventing electromagnetic radiation having other wavelengths from reaching the sensors 232. For example, the emitters 222 may emit 850 nm light. In this example, the filters 236 may be long-pass (or high-pass) filters that transmit electromagnetic radiation having a wavelength of 850 nm or greater. Alternatively, the filters 236 may be band-pass filters that transmit 850 nm light and wavelengths within a band of wavelengths greater than and less than 850 nm. Thus, the filters 236 are designed to help eliminate or minimize light from images collected by the sensors 232 that does not come from objects within the region of interest 125 such that the position of objects in the region of interest 125 (such as the hand 111 shown in FIG. 1A) may be more easily determined. However, some ambient light sources within the field of view of one or more of the sensors 232 may emit electromagnetic radiation of the same wavelengths as the electromagnetic radiation emitted from the emitters 222, and the filters 236 may transmit radiation from such ambient light sources.

For example, an incandescent light may emit electromagnetic radiation within a range of 400 nm to 900 nm including sufficient electromagnetic radiation at 850 nm such that an incandescent light in the field of view of the sensors 232 is imaged by the sensors 232 even with the filters 236 in place. Thus, the filters 236 may not eliminate all of the ambient light present in the fields of view of the sensors 232. However, as discussed below, for example, with respect to FIGS. 8 and 9, ambient light sources remain constant, or nearly constant, across two frames collected by the sensors 232. Thus, the effects of ambient light sources may be removed, or greatly reduced, by mathematically removing portions of the data collected by the sensors that remain constant frame-to-frame. The hub 275 may combine the data from multiple sensors 232 into a single data stream that is transmitted to the processor 265, or to the analysis module 240.

The interaction interface 210 also includes an analysis module 240. The analysis module 240 determines a position or an indicia of a position of an object in the region of interest 125 (such as the hand 111 shown in FIG. 1A). The analysis module 240 includes a comparison module 242, a position determination module 244, and a background modeling module 246. The comparison module 242 modifies images taken by a particular sensor 232 during an emitting period based on images taken by the same sensor 232 during an extinguishing period. The comparison module 242 may modify the images by, for example, subtracting an image taken during the extinguishing period from an image taken during the emitting period. Regardless of the technique used to modify the images collected during the emitting period based on the images collected during the extinguishing period, the comparison module 242 performs the technique on images collected from all sensors included in the sensor system 220. The techniques performed on data collected by each of the individual sensors 232 may be the same or different techniques may be used for each sensor.

The background modeling module 246 further modifies the images by removing (by subtraction, for example) static objects that are illuminated by the projected radiation during the emitting period such as a part of a ceiling that reflects the projected radiation back downwards. The background modeling module 246 samples images modified by the comparison module 242, and stores into memory 260 a number of samples spanning a period of time. The background modeling module 246 further selects, for each part of the image, an intensity that is representative of the part in the majority of the samples, as a model of the background reflection of the projected radiation that remains static. The model of the background reflection is subtracted (or otherwise removed) from the images modified by the comparison module 242, producing images modified by both the comparison module 242 and background modeling module 246.

The interaction interface 210 also includes an application interface 250. The application interface 250 communicates data between the interaction interface 210 and the device 290, which runs an application 295. In particular, the application interface 250 communicates a position, or indicia of the position, of an object in the region of interest 125 to the device 290. The device 290 passes the position, or indicia of position, to the application 295 and the application 295 reacts based on the position, or indicia of position. The application interface 250 may be a wireless or wired interface between the interaction interface 210 and the device 290. For example, the application interface 250 may be a Universal Serial Bus (USB) port on the housing 215 that accepts a USB cable connected to the application 295. In another example, the application interface 250 may be a Bluetooth wireless transceiver through which the interaction interface communicates data to the device 290 through the Bluetooth protocol. In other examples, the application interface 250 may be an infrared transceiver, an Ethernet port, a FireWire port, or a WiFi transceiver.

The interaction interface 210 also includes a controller 255. The controller 255 controls the emitters 232 such that the emitters 232 emit electromagnetic radiation during an emission period (e.g., the emitters 232 are ON during the emission period) and the emitters 232 extinguish electromagnetic radiation during an extinguishing period (e.g., the emitters 232 are OFF during the extinguishing period). The controller 255 also may control the operation of the sensors 232. For example, the controller 255 may determine a frame rate of the sensors 232, and the controller 255 may determine the timing of the transfer of data collected by the sensors 232 to the storage medium 260 and/or the timing of the analysis of the data collected by the sensors 232 by the analysis module 240. Additionally, the controller 255 may control the emitting and extinguishing periods of the emitters 222 by synchronizing the emitting and extinguishing periods of the emitters 222 to the frame rate of the sensors 232. In some implementations, the controller 255 may control the frame rate of the sensors 232 by synchronizing the frame rate of the sensors 232 to coincide with the emitting and extinguishing periods of the emitters 222. Controlling the sensors 232 in this manner may ensure that the sensors 232 collect data during an emitting period and an extinguishing period. The controller 255 also may determine the timing of the communications between the interaction interface 210 and the device 290.

The interaction interface 210 also includes the memory 260. The memory 260 may be local to the interaction interface 210 and may be enclosed within the housing 215. The memory 260 may be a semiconductor memory device, such as an Erasable Programmable Read-Only Memory (EPROM), an Electrically Erasable Programmable Read-Only Memory (EEPROM), a flash memory device, or another type of component or medium that stores data. The memory 260 may store data collected by the sensors 232. The data collected by the sensors 232 is passed to the analysis device 240 for processing, and the processed data may be stored on the memory 260. For example, a position, or indicia of a position, of an object in the region of interest 125 may be stored on the memory 260. The memory 260 also may store instructions that implement the analysis performed by the comparison module 242 and the position determination module 244. The instructions may be in the form of, for example, a computer program. In some implementations, the memory 260 is configured to overwrite stored data with recently received data. Thus, in these implementations, the memory 260 may be relatively small.

The interaction interface 210 also includes the processor 265. The processor 265 may be any type of processor that receives instructions and data from a memory device (such as the memory 260), where the instructions cause the processor to perform one or more actions. For example, the processor 265 may receive instructions from the memory 260 such that the processor 265 determines a position or an indicia of a position of an object in the region of interest 125. The processor 265 may be local to the interaction interface 265 such that the processor 265 is enclosed in the housing 210; however this is not necessarily the case. For example, in some implementations, the processor 265 may be co-located with the device 290. In these implementations, the application interface 250 may communicate data collected by the sensors to the device 290 where the data is passed to the processor 265 for processing.

The interaction interface 210 also includes the power module 270. The power module 270 receives power and distributes the power to other components of the interaction interface 210 such that the power module 270 allows the interaction interface 210 to be powered ON or turned OFF. For example, the power module 270 supplies power to the emitters 222, the sensors 232, the application interface 250, the memory 260, and the processor 265. The power module 270 may be a port that opens to an exterior of the housing 215 and accepts a power connection. The power connection may be, for example, a plug that connects to an AC power supply that connects to a standard wall power outlet. In other examples, the power module 270 may be combined with the application interface 250 such that the interaction interface 210 receives power through the same medium as the interaction interface 210 communicates with the device 290. For example, the interaction interface 210 may receive power through a USB cable that is also connected to the device 290. In other implementations, the power module 270 may be local to the interaction interface 210. For example, the power module 270 may be a battery in the interaction interface 210.

The distribution of the power from the power module 270 may be controlled by the controller 255. For example, the controller 255 may withhold power from one or more components that are not being used in order to reduce the amount of power used by the interaction interface 232. In another example, the controller 255 may place the interaction interface 210 in a "standby" or "sleep" mode when the interaction interface 210 has not been active for a predetermined amount of time (for example, 10 minutes).

The interaction interface 210 communicates with the device 290 through the application interface 250. The device 290 runs an application 295 that is controlled based on the data received from the interaction interface 210. For example, the device 290 may be a personal computer and the application 295 may be a game designed to run on the personal computer. In this example, an avatar representing a player of the game 295 is controlled through the interactions of the player with the interaction interface 210. For example, the player may move one of their fingers above the interaction interface 210 such that the finger moves within the region of interest 125 of the interaction interface 210. In response, an avatar in the game 295 moves.

Although in the example shown in FIG. 2, the device 290 that runs the application 295 and the interaction interface 210 are shown as separate components, this is not necessarily the case. For example, in some implementations, the device 290 may be enclosed within the housing 215 or otherwise co-located with the interaction interface 210. In another example, the application 295 may run on a processor co-located with the interaction interface 210 without the device 290.

Figure 3A:
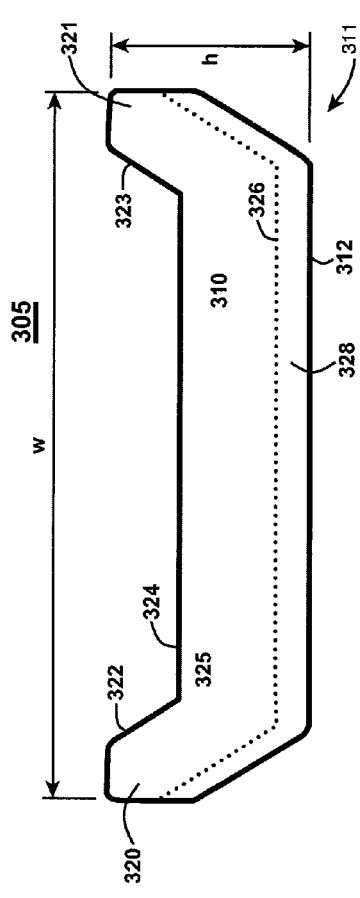
FIG. 3A a front view of an example interaction interface.
Figure 3B:
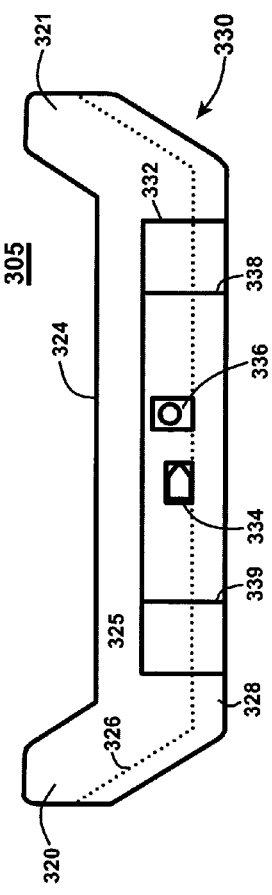
FIG. 3B shows a back view of an example interaction interface.
Figure 3C:
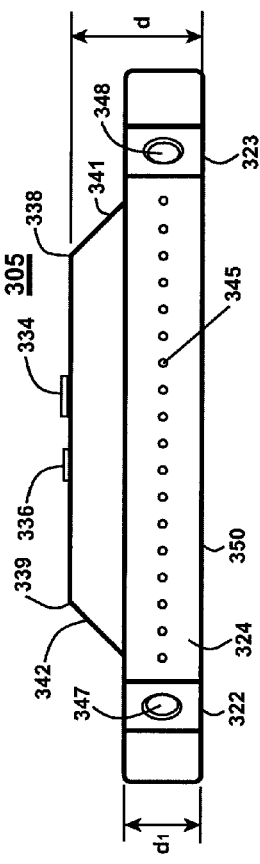
FIG. 3C shows a top view of an example interaction interface.

Referring to FIGS. 3A-3C, a front view, a back view, and a top view of an example interaction interface 305 are respectively shown. The interaction interface 305 may be similar to the interaction interface 105 and/or the interaction interface 210 discussed above with respect to FIGS. 1A and 2, respectively.

Referring to FIG. 3A, a front view of the interaction interface 305 is shown. In the example shown in FIG. 3A, the profile of a housing 310 of the interaction interface 305 is shown from front 311 as, for example, the interaction interface 305 rests on a bottom side 312 on a platform or table (not shown). The profile of the housing 310 is represented by the solid line. In the example shown, the housing 310 has a shape that is generally "U-shaped"; however, in other examples, the housing 310 may have a different shape. The housing 310 includes a left flange 320 and a right flange 321 that each extend upward from a flat top portion 324 of the housing 310. The right and left flanges 320 and 321 respectively include a slanted edge 322 and a slanted edge 323. The housing 310 includes a top portion 325 having a substantially flat surface in the region between the flat top portion 324 and a boundary 326. The example shown in FIG. 3A includes a beveled portion 328 that slopes at an angle such that a thickness of the housing 310 narrows between the boundary 326 and the bottom side 312. In other examples, the beveled portion 328 may be flat such that the beveled portion 328 and the top portion 325 have a flat surface when joined. The beveled portion 328 may be unitary with the top portion 325 or the beveled portion 328 may be removable from the top portion 325. In implementations having a removable beveled portion 328, the beveled portion 328 may be secured to the top portion 325 by a fixation device such as latches or screws. In some implementations, the beveled portion 328 may be a clamshell section that snaps onto the top portion 325.

The width of the housing 310 is represented by a length "w." The length "w" may be, for example, approximately 15.75 inches (e.g., 40.0 centimeters). The height of the housing is represented by a height "h." The height of the housing 310 may be, for example, approximately 4.25 inches (e.g., 10.8 centimeters). In another example of the housing 310, the length "w" is approximately 13.25 inches (e.g., 33.7 centimeters), and the height "h" is approximately 2.5 inches (e.g., 6.4 centimeters). In some implementations, the bottom side 312 may be as wide, or almost as wide, as the length "w." Referring to FIG. 3B, a back view of the interaction interface 305 is shown. Similar to the front 311 shown in FIG. 3A, the back 330 of the interaction interface includes the right and left flanges 320 and 322, the top portion 325, the boundary 326, and the beveled portion 328. In addition, the back 330 includes a port section 332, which includes a communications port 334 and a power port 336. The communications port 334 may be similar to the application interface 250, and the power port 336 may be similar to the power module 270 discussed above with respect to FIG. 2. In the example shown in FIG. 3B, the communications port 334 is a port configured to accept a FireWire connection, and the power port 336 is a port configured to accept a round power adaptor plug. Boundaries 338 and 339 indicate edges of the port section 332.

Referring to FIG. 3C, a top view of the interaction interface 305 is shown. The top view shows the top flat surface 324, the left and right flanges 320 and 321, the slanted portions 322 and 323, the port section 332, the communications port 334, and the power port 336. In the example shown, holes 345 are formed in the top flat surface 324. The holes 345 may be sized to accept emitters of electromagnetic radiation, such as the emitters 222 discussed above with respect to FIG. 2. The holes 345 may be, for example, 6 millimeters in diameter. Sensor openings 348 and 349 are respectively formed in the slanted portions 322 and 323. The sensor openings 348 and 349 may each be sized to receive a sensor that senses electromagnetic radiation within a field of view of the sensor. The sensor openings 348 and 349 may be sized to receive the sensors 232 discussed above with respect to FIG. 2. In some implementations, the sensor openings 348 and 349 both have an approximate diameter of 16 millimeters. The sensor openings 348 and 349 are generally circular in shape, although the sensor openings 348 and 349 may have any shape that accommodates the sensors. However, in the example shown in FIG. 3C, the sensor openings 348 and 349 are shown as having an elliptical shape because of the position of the openings 348 and 349 on the slanted portions 322 and 323. In some implementations, the sensor openings 348 and 349 may be located separate from the flanges 320 and 321. For example, the sensor openings 348 and 349 may be formed in the top portion 325 in implementations in which the sensors (such as the sensors 232) are recessed into the top portion 325.

In the example shown in FIG. 3C, the holes 345 are linearly disposed and equally spaced on a surface of the top flat surface 324. Additionally, in the example shown in FIG. 3C, the holes 345 are linearly disposed along a line that, if extended, would intersect the center of the sensor openings 348 and 349. The center of the sensor openings 348 and 349 is also the point at which the optical axis for the sensors inserted into the openings 348 and 349 would pass. However, in other examples, the holes 345 may be arranged in a different pattern. For example, the holes 345 may be arranged in a pattern that alternates the placement of the holes 345 such that a first hole is close to a rear edge 352 of the flat top portion 324 and the neighboring holes are close to a front edge 350 of the flat top portion 324. Such an arrangement may result in a thicker radiation region 140.

The depth of the interaction interface 310 is shown by the depth "d." The thickness of the interaction interface may be approximately 5.5 inches (e.g., 14.0 centimeters). Of the depth "d," a depth "$d_1$" represents a portion of the housing without the port section 332. In the example shown in FIG. 1C, the depth "$d_1$" is approximately 3.255 inches (e.g., 8.3 centimeters). In another example of the housing 310, the depth "d" is approximately 2.5 inches (e.g., 6.4 centimeters) and the depth "$d_1$" is approximately 1.375 inches (e.g., 3.5 centimeters). In other examples, the port section 332 may have a smaller depth, or the port section 332 may be designed such that the port section is flush with the other portions of the housing (e.g., such that the thickness of the interaction interface 310 is approximately 3.5 centimeters). In the example shown in FIG. 3C, the communications port 334 and the power port 336 protrude slightly from the rear of the housing 310. However, in other examples, the communications port 334 and the power port 336 may be flush with the surface of the housing 310. In other examples, cables may be permanently affixed to the communications port 334 and the power port 336.

Figure 4A:
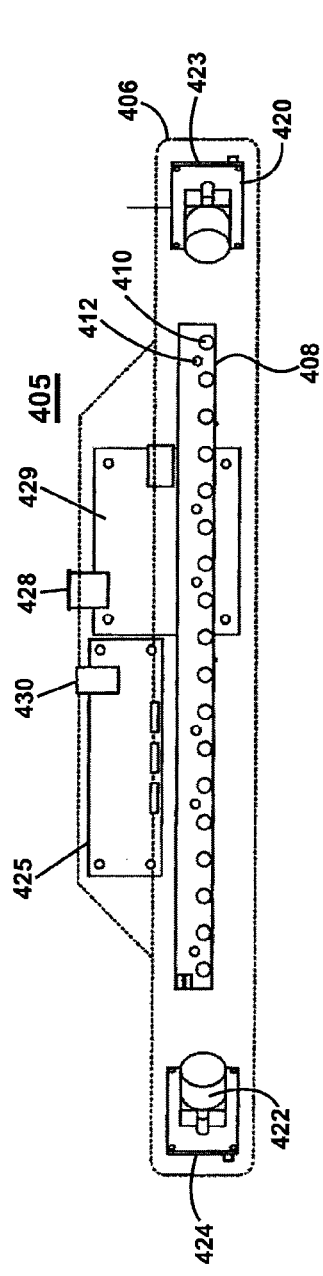
FIGS. 4A and 4D show a top view of an interior of an example interaction interface.
Figure 4B:
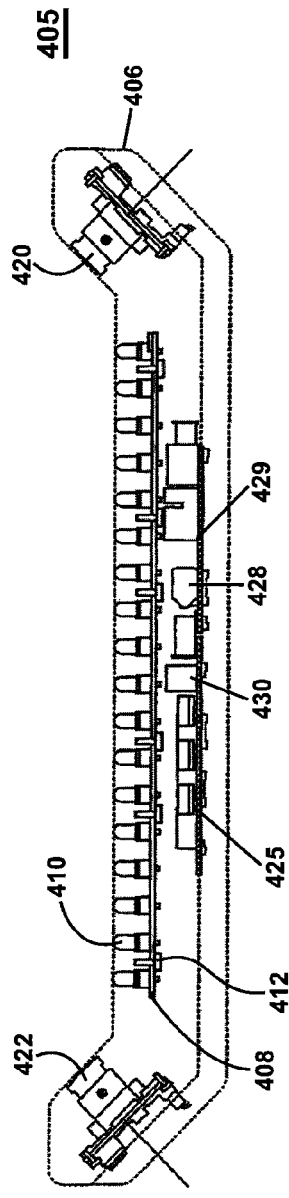
FIGS. 4B, 4C, and 4E show a front view of an interior of an example interaction interface.
Figure 4C:
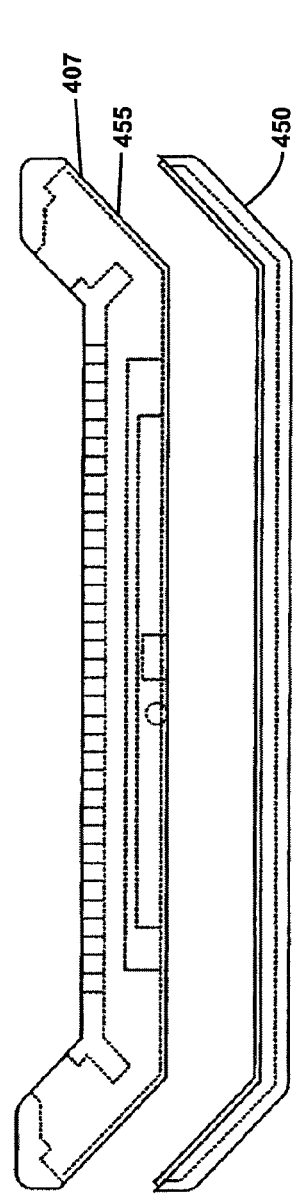

Referring to FIGS. 4A-4C, an interior of an example interaction interface 405 is illustrated. In particular, FIG. 4A illustrates the interior of the interaction interface 405 from a top view, and FIGS. 4B and 4C illustrate the interior of the interaction interface 405 from a front view. The interaction interface 405 may be an interaction interface similar to the interaction interfaces 105, 210, and/or 305 discussed above with respect to FIGS. 1A-1C, 2, and 3. In the examples shown in FIGS. 4A and 4B, a housing of the interaction interface 405 (which may be similar to the housing 310 discussed above with respect to FIGS. 3A-3C) is represented by a dotted outline 406. In the example shown in FIG. 4C, the housing of the interaction interface 405 is represented with a solid outline 407.

Referring to FIG. 4A, the interior of the interaction interface 405 includes an emitter mounter 408, emitters 410, an emitter fastener 412, a sensor 420, a sensor 422, an emitter driver 425, a communications port 428, a hub 429, and a power connector 430. The emitter mounter 408 is a bracket, or other mounting device, that holds the emitters 410 securely in place. For example, holes may be formed in the emitter mounter 408 such that the emitters 410 may be securely fastened into the holes (and therefore securely fastened to the emitter mounter 408). The emitters 410 may be fastened into the holes using, for example, glue, screws, or an interference fit between the emitters 410 and the emitter mounter 408. Securing the emitters to the emitter mounter 408 may ensure that the radiation region 140 remains in substantially the same position with respect to the interaction interface 405 over the lifetime of the interaction interface 405 even though the interaction interface 405 may be transported and/or mishandled (e.g., accidentally dropped) many times over the lifetime. The emitter fastener 412 secures the emitter mounter 408 within the interaction interface 405. The emitter fastener 412 may include an opening in the emitter mounter 408 through which a fastener (such as a screw or peg) passes to secure the emitter mounter 408 within the interaction interface 405. The interaction interface 405 also includes sensor mounters 423 and 424. The sensor mounters 423 and 424 secure the sensors 420 and 422 to the interaction interface 405.

Referring to FIG. 4B, a front view of the interior of the interaction interface 405 is shown. In particular, the emitters 410 are shown placed in the emitter mounter 408, and the emitter mounter 408 is shown as secured within the interaction interface 405 by the emitter fastener 412. In the example shown in FIG. 4B, the emitter driver 425, the communications port 428, the hub 429, and the power port 430 are located generally below the emitter mounter 408. Such a design may be advantageous in implementations in which the emitter driver 425, the communications port 428, the hub 429 and/or the power port 430 are located in a portion of the interaction interface 405 that protrudes from a housing of the interaction interface 405 (such as the port section 332 discussed above with respect to FIGS. 3B and 3C). In particular, having the port section 332 located toward the bottom of the interaction interface 405 may help to stabilize the interaction interface 405 such that the interaction interface 405 may rest solidly on a table or platform while in use.

In the example shown in FIG. 4B, the emitters 410 and the sensors 420 and 422 are recessed into the housing of the interaction interface 405 such that the emitters 410 and the sensors 420 and 422 are flush with a surface of the housing of the interaction interface 405. In other examples, any or all of the emitters, the sensor 420, and the sensor 422 may be recessed deeper into the interaction interface 405 such that these elements are not flush with the surface of the housing of the interaction interface 405.

Referring to FIG. 4C, a front view of the interaction interface 405 is shown. In this example, the interaction interface includes two separable portions: a base portion 450 and a top portion 455. The base portion 450 may be similar to the beveled portion 328 discussed above with respect to FIGS. 3A-3C. The top portion 455 may be secured to the base portion 450 to form the interaction interface 405. The interior of the top portion 455 includes the emitters 410, the sensors 420 and 422, the communications port 428, and the power port 430.

Figure 4D:
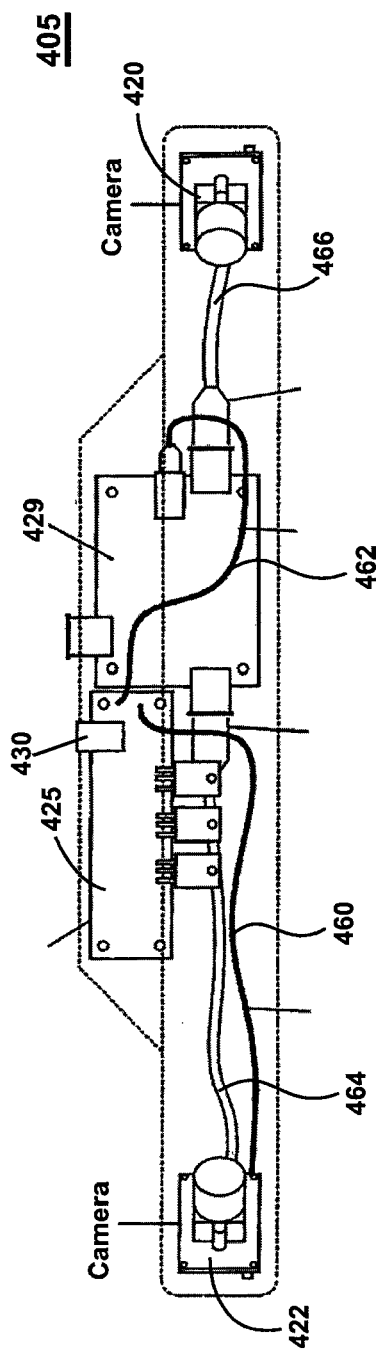
Figure 4E:
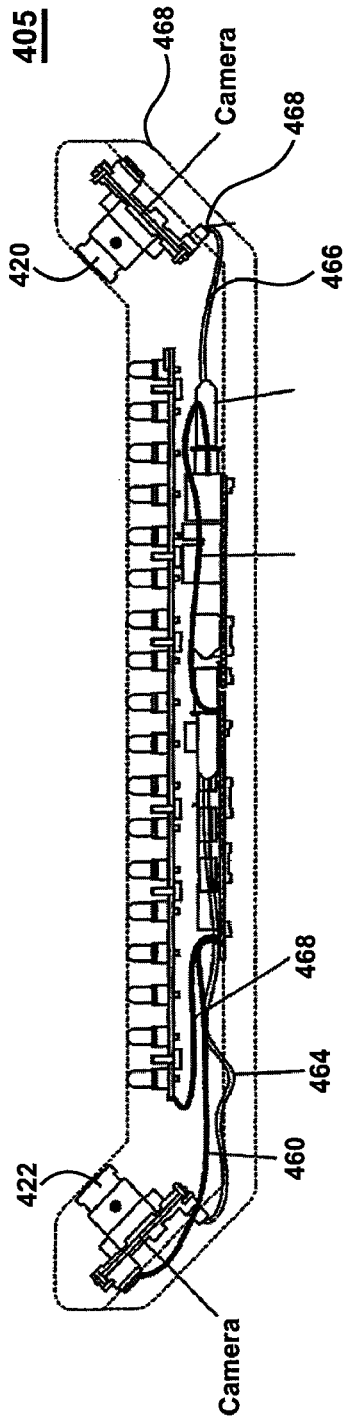

Referring to FIGS. 4D and 4E, the interior of the interaction interface 405 is shown with internal wiring. FIG. 4D illustrates a top view of the interior of the interaction interface 405, and FIG. 4E illustrates a front view of the interior wiring of the interaction interface 405. As shown in FIG. 4D, a connection 468 between the emitter driver 425 and the sensor 422 synchronizes the emitter driver 425 with the sensor 422. The emitter driver 425 may be similar to the emitter driver 228 discussed above with respect to FIG. 2, and the emitter driver 425 may drive the emitters 410 such that the emitters 410 are ON and emit electromagnetic radiation during an emitting period and the emitters 410 are OFF and extinguish electromagnetic radiation during an extinguishing period. Thus, synchronizing the emitter driver 425 with the sensor 422 may ensure that the sensor 422 collects data during the emitting period and the extinguishing period. Additionally, synchronizing the emitter driver 425 with the sensor 422 may ensure that the sensor 422 does not collect data during a transition period between the emitting period and the extinguishing period. As also shown in FIG. 4A, a connection 462 connects the emitter driver 425 to the hub 429 such that the emitters 410 may be supplied power during the emitting period such that the emitters emit electromagnetic radiation. Also shown in FIG. 4D are connections 464 and 466. The connection 464 is a data connection to the sensor 422, and the connection 466 is a data connection to the sensor 420. The connections 464 and 466 may be FireWire connections, or any other suitable data connection. The combinations of connections 460, 464, and 466 allow the emitter driver 425, hub 429, sensor 420, and sensor 422 to draw power from a common power port 430.

Referring to FIG. 4E, a front view of the interior wiring of the interaction interface 405 is shown. In addition to the connections discussed above, the example shown in FIG. 4E indicates that the connection 468 is also connected to the emitters 410. Thus, the sensor 422 and the emitters 410 are synchronized together. Although many emitters 410 are shown in the example of FIG. 4E, the connection 468 is input in the vicinity of only one emitter. In some implementations, the emitters 410 are connected to each other such that all of the emitters 410 are driven together through the connection 468. In other implementations, a connection from the driver 425 may be made to each of the emitters 410. Additionally, the illustration of FIG. 4E shows that the connections 464 and 466 are connected to the sensors 420 and 422, respectively, through a connector 468 on each of the sensors 420 and 422.

Figure 5A:
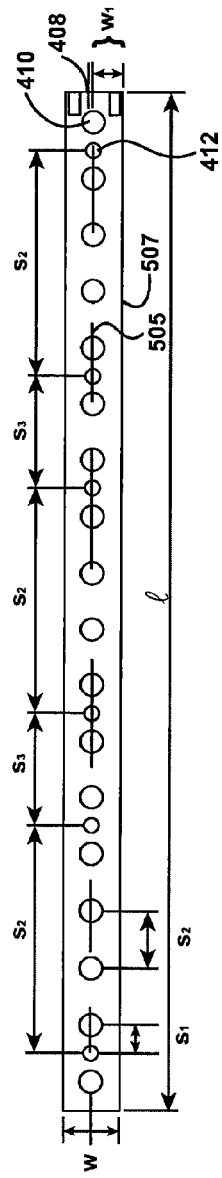
FIGS. 5A and 5B shows a front view of example emitters.
Figure 5B:
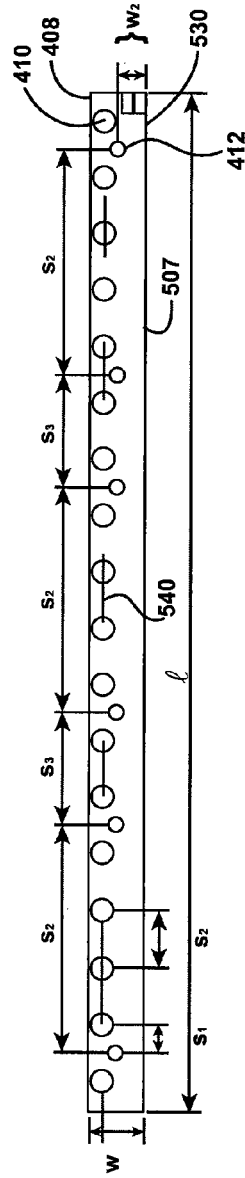

Referring to FIGS. 5A and 5B, the emitter mounter 408, the emitters 410, and the emitter fasteners 412 are illustrated. In the example shown in FIG. 5A, the emitters 410 and the emitter fasteners 412 are linearly disposed along a center line 505 that travels lengthwise along the center of the emitter mounter 408. The emitter mounter 408 has a length "l," which may be approximately 9 inches (e.g., 22.9 centimeters). The emitter mounter 408 may have a width of "w," and the center line 505 may be located a distance "d," which is half of the width "w," from an edge 507 of the emitter mounter 408. In some implementations, the distance "w" may be approximately 0.5 inches (e.g., 1.3 centimeters), and the distance "d" may be approximately 0.25 inches (e.g., 0.65 centimeters). The emitters 410 may be equally distributed along the emitter mounter 408, and the center-to-center spacing of the emitters 410 may be a distance "s." The distance "s" may be approximately 0.5 inches (e.g., 1.3 centimeters). Emitter fasteners 412 may be interspersed among the emitters 410. Where present, a center of an emitter fastener may be a distance "$s_1$" from the center of a neighboring emitter. The distance "$s_1$" may be 0.25 inches (e.g., 0.65 centimeters). The center-to-center distance between emitter fasteners 412 may be one or more of a distance "$s_2$" or a distance "$s_3$," depending on the arrangement of the emitters 410 and the emitter fasteners 412.

Referring to FIG. 5B, an example of an emitter mounter 530 is shown. The emitter mounter 530 is similar to the emitter mounter 408, except the emitters 410 are linearly disposed on the emitter mounter 530 along an off-center line 540 such that the centers of the emitters 410 are located a distance "$w_2$" from the edge 507 of the emitter mounter 530. The emitter fasteners 412 are located along the center line 505. Positioning the emitter fasteners 412 along the center line 505 instead of the off-center line 540 may help to ensure that the emitter mounter 530 is secured in the interaction interface 405 such that the emitters 410 do not move relative to the interaction interface 405.

Figure 5C:
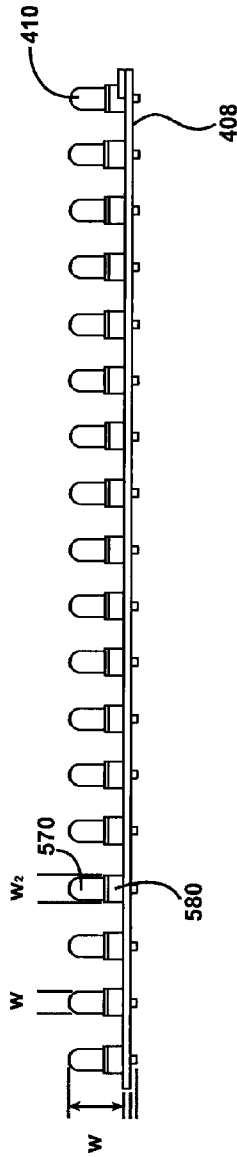
FIG. 5C shows a side view of example emitters.

Referring to FIG. 5C, a side view of the emitters 410 is illustrated. The emitters 410 are positioned into the emitter mounter 408. The emitters 410 each have a height of "h" and a width of an radiating portion 570 of "w." The emitters 410 shown in the example of FIG. 5C also have a base portion 580, in which the radiating portion rests or is otherwise connected. The base portion 580 has a width of "w2," and the emitters 410 are connected onto the emitter mounter 408 at the base portion 580. The base portion 580 does not emit electromagnetic radiation, thus the emission of electromagnetic radiation from the emitters 410 is not effected by the connection of the base portion 580 to the emitter mounter 408. In some implementations, the height "h" is approximately 0.5 inches (e.g., 1.3 centimeters), the width "w" is 5 millimeters, and the width "w1" is 6 millimeters. The emitter mounter 408 may have a height "h" of approximately 0.0625 inches (e.g., 0.2 centimeters).

Referring to FIGS. 6A-6C, examples of radiation regions 610, 620, and 630 are respectively shown. The radiation regions 610, 620, and 630 may be used as the radiation region 140 discussed above with respect to FIGS. 1A-1C.

Referring to FIG. 6A, a radiation region 610 is shown from a side view. The radiation region 610 has a uniform thickness "t" and is generated by an emitter 615. The uniform thickness "t" as a result of passing electromagnetic radiation from the emitter 615 though a lens, such as a narrow angle lens, such that the emitted electromagnetic radiation is substantially collimated. In some implementations, the radiation region 610 may be made to appear to have a uniform thickness "t" by cropping data received from sensors imaging the radiation region 610. Referring to FIG. 6B, a radiation region 620 is shown. In comparison to the radiation region 610 shown in FIG. 6A, the radiation region 620 has a cone shaped cross-section (e.g., electromagnetic radiation emitted from an emitter 625 diverges as the electromagnetic radiation propagates upward). Referring to FIG. 6C, a radiation region 630 is shown. The radiation region 630 is collectively defined as a volume of projected electromagnetic radiation emitted from electromagnetic radiation emitted from multiple emitters 635. Although the electromagnetic radiation emitted from the emitters 635 diverge as the radiation propagates upward, the radiation region 630 is contained within the edges of an interaction interface 640. The radiation region 630 may be contained by, for example, passing the emitted electromagnetic radiation through a narrow angle lens (not shown) such that the divergence of the electromagnetic radiation is reduced.

Figure 7:
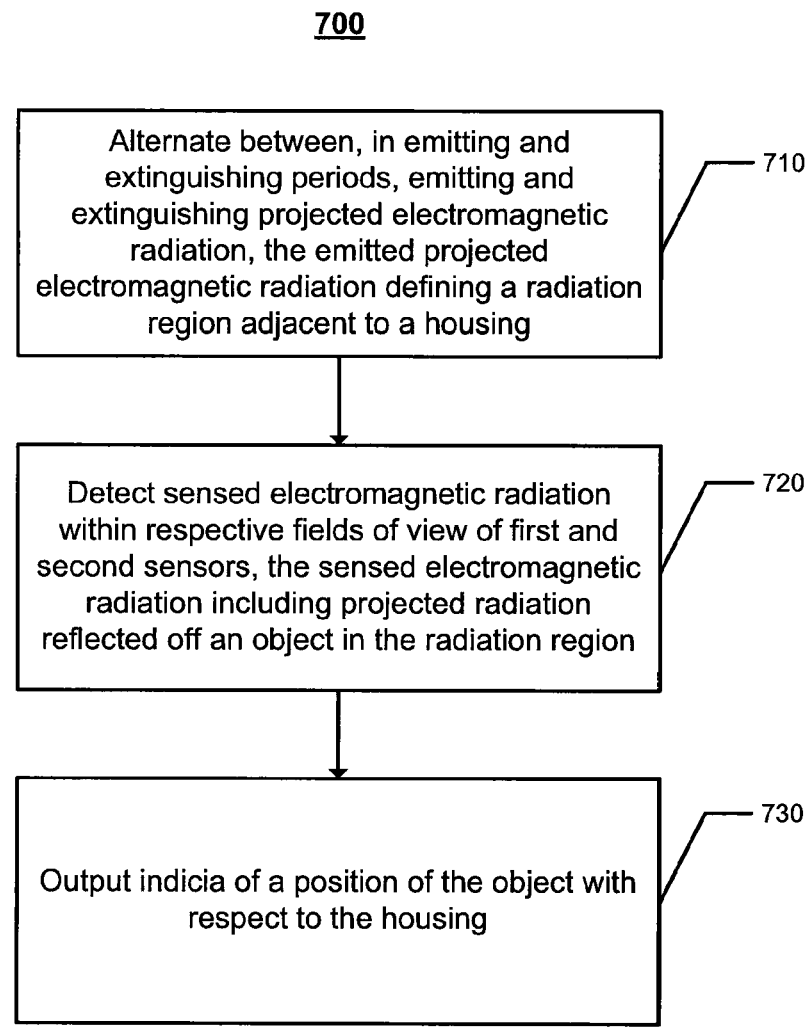
FIGS. 7 and 8 show example processes.

Referring to FIG. 7, an example process 700 for outputting an indicia of a position of an object with respect to an interaction interface is illustrated. The process 700 may be performed on an interaction interface such as the interaction interface 205 discussed above with respect to FIG. 2. The process 700 may be performed by one or more processors included in the interaction interface, such as the processor 265 and/or the controller 255. The process 700 may be used to output a position, or an indicia of a position, of an object within a region of interest associated with the interaction interface. For example, the process 700 may be used to output a position of the hand 111 shown in FIG. 1A.

Emitted projected radiation defines a radiation region adjacent to a housing (710). The projected radiation alternates between being emitted and being extinguished during emitting and extinguishing periods, respectively. The projected electromagnetic radiation may be emitted from emitters included in the interaction interface, such as the emitters 222 discussed above with respect to FIG. 2, and the housing may be a housing such as the housing 106 discussed above with respect to FIGS. 1A-1C. The projected electromagnetic radiation may be emitted vertically from a top side of the housing such that the radiation region is adjacent to the housing by being in a volume above the top side of the housing. The projected electromagnetic radiation decreases in intensity as the radiation propagates away from the housing. In implementations in which the interaction interface is used indoors, the electromagnetic radiation emitted from the emitters eventually reaches the ceiling and is reflected from the ceiling.

Sensed electromagnetic radiation is detected within respective field of view of first and second sensors (720). The sensed electromagnetic radiation includes ambient electromagnetic radiation detected during the emitting and the extinguishing periods. The sensed electromagnetic radiation also includes projected electromagnetic radiation reflected off of an object in the radiation region during the emitting period. During the extinguishing period, the emitters emit no or very little light. Thus, projected radiation is not reflected off of the object in the radiation region (such as the hand 111) during the extinguishing period. However, the first and second sensors detect electromagnetic radiation from self-illuminated sources in the field of views of either or both of the first and second sensors. For example, the sensors may detect the presence of a ceiling light such as the ceiling light 119 shown in FIG. 1A. As discussed in more detail in FIG. 8, relatively constant sources of ambient light may be removed from the data collected by the first and second sensors due to the alternating nature of the projected electromagnetic radiation. The first and second sensors may be sensors that are located on opposing ends of a housing of the interaction interface, such as the sensors 420 and 422 discussed above with respect to FIGS. 4A-4E. Additionally, the specifications and properties of the first and second sensors may be similar to the sensors 232 discussed with respect to FIG. 2.

An indicia of a position of the object with respect to the housing is output (730). The indicia of the position of the object may be, for example, raw image data from the sensors that includes a representation of the object. The raw data may be output though the application interface 250 discussed above with respect to FIG. 2. In other examples, the indicia of the position of the object may be image data derived from an image collected during an emitting period and an image collected during an extinguishing period. In other examples, the indicia of the position may be two-dimensional or three-dimensional coordinates associated with the position of the object with respect to a location within or on the boundary of a region of interest within the radiation region. The position or indicia of the position of the object may be represented in coordinates relative to the housing. In some examples, the object may be moving within the region of interest, and the sensors may collect video data. In these examples, the indicia may be a two-dimensional or a three-dimensional representation of the motion of the object.

Figure 8:
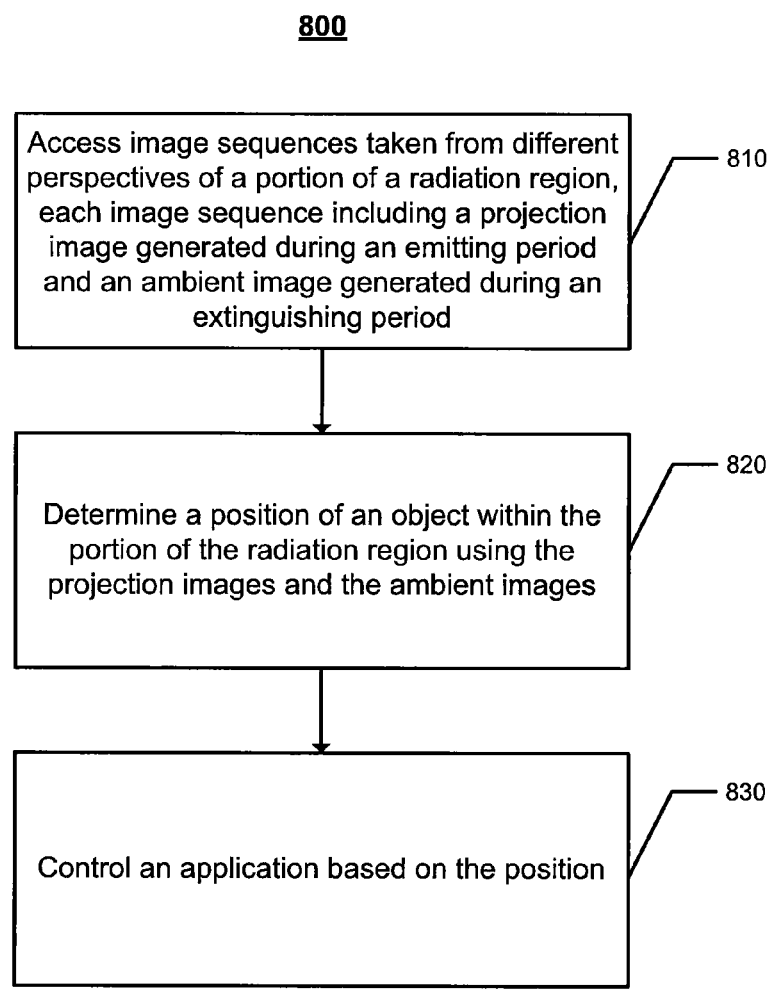

Referring to FIG. 8, an example process 800 may be used to control an application based on a determined position. The process 800 may be performed by one or more processors include in an interaction interface, or remote from but in communication with the interaction interface. For example, the process 800 may be performed by the processor 265 discussed above with respect to FIG. 2. The interaction interface may be an interaction interface similar to the interaction interface 205 discussed above with respect to FIG. 2. The process 800 may be used to control an application such as the application 115 discussed above with respect to FIG. 1A.

Image sequences taken from different perspectives of a portion of a radiation region defined by projected electromagnetic radiation are accessed (810). Each image sequence includes a projection image generated during an emitting period and an ambient image generated during an extinguishing period. The projection image is of ambient electromagnetic radiation (such as electromagnetic radiation emitted from self-illuminating sources similar to the ceiling light 119 of FIG. 1A) and of an object within the portion being illuminated with the projected electromagnetic radiation. The ambient image includes ambient electromagnetic radiation. The image sequence may include a pair of images from each perspective (e.g., an image collected during an emitting period and an image collected during an extinguishing period). However, the image sequence may include more than two images, so long as the image sequence includes at least one image collected during an extinguishing period.

A position of the object is determined using the projection images and the ambient images (820). As mentioned above, both the ambient and projection images include ambient sources of light, such as the ceiling light 119. However, only the projection images include images of objects that are only illuminated during an emitting period when electromagnetic radiation from emitters illuminates the objects. For example, the hand 111 shown in FIG. 1A is only imaged when the hand 111 is illuminated by the radiation region 140. Thus, the relative constant nature (e.g., brightness and position) of the ambient light allows the ambient light to be removed from the projection images while retaining the image of the object. For example, the ambient light may be removed from the projection region by, for example, subtracting the ambient image from the projected image to generate a difference image.

Figure 9:
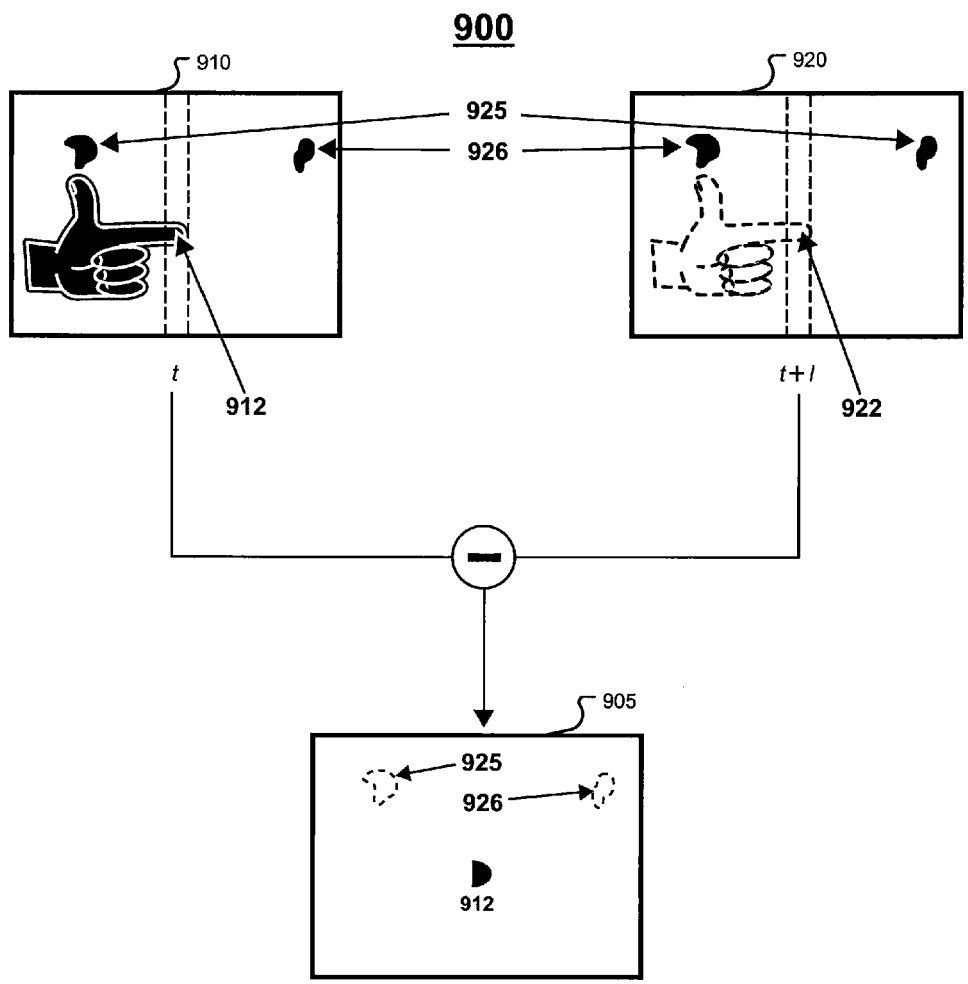
FIG. 9 shows an illustration of an example modification technique.

Referring briefly to FIG. 9, an example of a difference image 905 is shown. The images 910 and 920 shown in FIG. 9 are taken from one perspective of the radiation region (for example, the images 910 and 920 are taken from the same sensor). The difference image 905 is created from a projected image 910, which includes a finger 912, and the ambient image 910, which does not include the finger 912. The finger 912 appears in the projected image 910 because the finger 912 reflects projected electromagnetic radiation to the sensor that generated the projection image 910. Because the ambient image 920 was generated during an extinguishing period, there is no, or less, electromagnetic radiation for the finger 912 to reflect and the finger 912 does not appear in the image 920. The location where the finger 912 would appear is shown by the dashed line 922. However, self-illuminating ambient light sources 925 and 926 appear in both the projected image 910 and the ambient image 920.

The difference image 905 is generated by subtracting, or otherwise modifying, the ambient image 920 from the projected image 910. As a result, the ambient sources 925 and 926 are not present in the difference image. However, the finger 912 is present in the difference image 905 because the finger 912 is present only in the projection image. In some implementations, the projected image 910 is generated from data collected during the emitting period immediately before or immediately after the extinguishing period during which the ambient image 920 is collected. Collecting the data sequentially may help to ensure that the ambient light sources 925 and 926 are constant between the projection and ambient images. The difference image 905 includes pixels, and each of the pixels has one or more associated numerical values. In some implementations, the difference image 905 is analyzed to determine whether the difference image 905 includes any pixels that are associated with a negative value (e.g., a numerical value that is less than zero). A pixel may be associated with a negative value when a pixel in the ambient image 920 has a larger value than the corresponding pixel in the projected image 910. Negative pixel values may be set to zero.

The example shown in FIG. 9 is from the perspective of one sensor. A similar technique may be applied to data collected from the perspective of a second sensor. Based on the relative positions of the finger 912 in the difference image from each perspective, the known positions of the sensors relative to a housing of the interaction interface and the region of interest, the position of the finger 912 may be determined. The position of the finger 912 may be determined, for example, with respect to the housing. In other examples, the position of the finger 912 may be determined with respect to the region of interest.

Returning to FIG. 8, determining the position of the object using the projection images and the ambient images also may include modifying the difference image based on a background model. As discussed above, the projected electromagnetic radiation propagates upward and may reflect of a ceiling, or other barrier, above the interaction interface. The reflections from the ceiling are seen only in the projection image, thus, the reflections also may appear in the difference image. However, the reflection off of the ceiling may be relatively constant over time. Accordingly, the reflection off of the ceiling may be modeled and subtracted or otherwise removed from the difference image.

An application is controlled based on the determined position (830). The application may be controlled by communicating the position to the application through an application interface, such as the application interface 250 discussed above with respect to FIG. 2. Controlling the application based on the position may include moving a cursor within the application, or selecting an icon within the application based on a motion or a gesture of the finger 912.

Other implementations are within the scope of the following claims. For example, determining a position of an object with respect to a housing of an interaction interface may include determining a motion of the object with respect to the housing of an interaction interface. Determining a motion of the object may include determining a gesture made by the object or with the object. The size of the housing of the interaction interface may be made of a standard size such that it fits in commonly available luggage and bags. For example, a width of a housing may be approximately equal to the width of a portable personal computer such that the interaction interface may be transported along with existing equipment. In some implementations, the emitters 410 may be arranged such that the emitters 410 surround one or both of the sensors 420 and 422. Although the interaction interface allows a user 110 to interact with the application 115 without directly touching a tactile device connected to the application 115, the interaction interface 105 may be used with a tactile device. For example, the user 110 may hold a pointer such that the pointer is the object 111 within the region of interest 125.

What is claimed is:

1. A computer-implemented method comprising:
accessing image sequences, the sequences each taken, from a different perspective, of a portion of a radiation region defined by projected electromagnetic radiation, and each image sequence including:
a projection image taken during an emitting period in which the projected electromagnetic radiation is emitted, the projection image being of ambient electromagnetic radiation and of an object within the portion being illuminated with the projected electromagnetic radiation, and
an ambient image taken during an extinguishing period in which the projected electromagnetic radiation is extinguished, the ambient image being of the ambient electromagnetic radiation;
determining a position of the object using the projection images and the ambient images; and
controlling an application based on the determined position.

2. The method of claim 1 further comprising alternating between, in the emitting and extinguishing periods, emitting and extinguishing the projected electromagnetic radiation.

3. The method of claim 1 further comprising generating modified images based upon modifying each projection image with a corresponding ambient image, wherein the position is determined using the modified images.

4. The method of claim 3, wherein generating the modified images comprises subtracting the corresponding ambient image from each projection image.

5. The method of claim 4, further comprising:
determining whether the modified images include pixel values less than zero, and
if the modified images include pixels values less than zero, setting any pixel value less than zero to zero.

6. The method of claim 1, wherein the projection image is of the ambient electromagnetic radiation, of the object within the portion being illuminated with the projected electromagnetic radiation, and of a reflection of a background illuminated by the projected electromagnetic radiation.

7. The method of claim 6, further comprising:
modeling the reflection of the background; and
modifying the projected image based on the modeled reflection.

8. The method of claim 1 further comprising compensating the ambient images to account for illumination of the object by the ambient electromagnetic radiation.

9. The method of claim 8, wherein the ambient light comprises unobscured ambient light not obscured by the object.

10. The method of claim 1, wherein each image sequences comprises at least a pair of images, the pair of images comprising the projection image and the ambient image.

11. The method of claim 10, wherein the ambient image is taken during an extinguishing period that immediately proceeds or immediately follows the emitting period during which the projected image is taken.

12. The method of claim 1, wherein determining the position comprises determining two-dimensional or three-dimensional coordinates representing the position relative to an edge of the region.

13. The method of claim 1, further comprising outputting the determined position to the application.

14. The method of claim 1, further comprising determining a motion of the object based on the determined position, where the application is controlled based on the determined motion.

15. The method of claim 1, wherein determining the position of the object using the projection images and the ambient images comprises:
determining a first position of the object using the projection images and the ambient images from a first sequence taken from the first perspective,
determining a second position of the object using the projection images and the ambient images from a second sequence taken from the second perspective, and
combining the first position of the object and the second position of the object.

16. The method of claim 15, wherein the first and second positions are combined using triangulation.

17. The method of claim 1, wherein the projected electromagnetic radiation comprises infrared light.

18. The method of claim 1, further comprising cropping each projection image and ambient image, wherein the position of the object is determined using the cropped projection images and ambient images.

19. The method of claim 1, further comprising a defining a region of interest within the radiation region.

20. The method of claim 19, wherein the position is expressed as a percentage of a height of the region of interest and a percentage of a width of the region of interest.

21. A device comprising:
a processor configured to:
access image sequences, the sequences each taken, from a different perspective, of a portion of a radiation region defined by projected electromagnetic radiation, and each image sequence including:
a projection image taken during an emitting period in which the projected electromagnetic radiation is emitted, the projection image being of ambient electromagnetic radiation and of an object within the portion being illuminated with the projected electromagnetic radiation, and
an ambient image taken during an extinguishing period in which the projected electromagnetic radiation is extinguished, the ambient image being of the ambient electromagnetic radiation,
determine a position of the object using the projection images and the ambient images, and
control an application based on the determined position; and
a memory configured to:
store the image sequences, and
transfer the image sequences to the processor.

22. A system comprising:
an interaction interface configured to control an application based on a position of an object, the interaction interface comprising:
a processor configured to:
access image sequences, the sequences each taken, from a different perspective, of a portion of a radiation region defined by projected electromagnetic radiation, and each image sequence including:
a projection image taken during an emitting period in which the projected electromagnetic radiation is emitted, the projection image being of ambient electromagnetic radiation and of an object within the portion being illuminated with the projected electromagnetic radiation, and
an ambient image taken during an extinguishing period in which the projected electromagnetic radiation is extinguished, the ambient image being of the ambient electromagnetic radiation, and
determine a position of the object using the projection images and the ambient images;
an application interface configured to output the position; and
a memory configured to:
store the image sequences, and
transfer the image sequences to the processor; and
a device executing the application, the device receiving the position and transferring the position to the application such that the application reacts based on the position.

23. A non-transitory computer-readable medium encoded with a computer program product comprising instructions that, when executed, operate to cause a computer to perform a method comprising:
accessing image sequences, the sequences each taken, from a different perspective, of a portion of a radiation region defined by projected electromagnetic radiation, and each image sequence including:
a projection image taken during an emitting period in which the projected electromagnetic radiation is emitted, the projection image being of ambient electromagnetic radiation and of an object within the portion being illuminated with the projected electromagnetic radiation, and an ambient image taken during an extinguishing period in which the projected electromagnetic radiation is extinguished, the ambient image being of the ambient electromagnetic radiation;

determining a position of the object using the projection images and the ambient images; and controlling an application based on the determined position.

* * * * *